May 19, 1964  W. L. L. LENDERS ETAL  3,133,627
VIBRATOR

Filed March 20, 1961  2 Sheets-Sheet 1

INVENTORS
WILHELMUS L.L. LENDERS
MARTINUS J. VAN HIRTUM
HERMAN G. DE COCK
BY Frank R. Trifari
AGENT May 19, 1964  W. L. L. LENDERS ETAL  3,133,627
VIBRATOR Filed March 20, 1961  2 Sheets-Sheet 2

INVENTORS
WILHELMUS L.L. LENDERS
MARTINUS J. VAN HIRTUM.
HERMAN G. DE COCK.
BY *Frank P. ...*
AGENT

United States Patent Office 3,133,627
Patented May 19, 1964

3,133,627
VIBRATOR
Wilhelmus Leonard Louis Lenders, Martinus Johannes van Hirtum, and Herman Gerard de Cock, all of Emmasingel, Eindhoven, Netherlands, assignors to North American Philips Company, Inc., New York, N.Y., a corporation of Delaware
Filed Mar. 20, 1961, Ser. No. 96,879
Claims priority, application Netherlands Mar. 31, 1960
11 Claims. (Cl. 198—220)

This invention relates to a vibrator particularly intended for use with a vibrating hopper. It is known to drive such vibrators by means of an alternating current of, for example, 50 cycles per second. In practice it is necessary to accurately adapt the natural frequency of the vibrating body to the frequency of the current, since otherwise the vibrator does not operate correctly or takes a comparatively high amount of energy. The adjustment of this natural frequency is a comparatively difficult task, which, as indicated above, must be carried out with great accuracy. The vibrator according to the invention, which is continuously driven by a continuous supply of gas, preferably air, under constant effective pressure is characterized in that provision is made of a vibrating plate the vibration of which is produced by gas-pressure differences in a gas chamber provided between the vibrating plate and a body arranged opposite the vibrating plate and being continuously in communication, via an opening which may be variable, with a gas supply duct. The periodic outlet of gas from this chamber to the outside being controlled by the vibrating plate, which is rigidly secured to a second body, and the second body is connected by elastic means with the first-mentioned body so that with respect to the first body the second body is capable of performing a vibration in a given plane and, in addition, a vibration in a plane normal to the former.

Since the vibrator according to the invention is capable of vibrating in its natural frequency, adjustment for frequency is unnecessary. The amplitude of the vibrations can be varied by a greater or smaller supply of gas. A further important advantage is that the gas supply duct does not comprise any moving part during operation so that no packing for sliding or rotating parts is required, which would necessitate taking special measures in practice.

In the preferred embodiment of the invention both the first body and the second body are arranged horizontally. In a further embodiment of the invention the vibrating plate is also arranged horizontally and the centre lines of the first body, the vibrating plate and the second body coincide with the same vertical line. In this manner a simple construction of the vibrator is obtained.

Also according to the invention the first body is arranged resiliently with respect to a horizontal plane so that this body is adapted to vibrate and a vibration-free arrangement of the assembly is obtained.

In the preferred embodiment of the invention both the first body and the second body have a circular shape and the elastic means between these bodies are formed by straight blade springs, uniformly distributed along the circumference and having their width arranged radially to the bodies, the longitudinal axis being at a small angle to the perpendicular. Thus vibration of the second body is obtained in two directions in a simple manner. Particularly when using the vibrator for a vibrating hopper, it is efficacious, in accordance with a further aspect of the invention, to choose the amplitude of the horizontal vibration of the second body so as to exceed the amplitude of the vertical vibration.

The gas chamber may be accommodated in the vibrating plate. It is to be preferred, in accordance with a further aspect of the invention to accommodate the gas chamber in the first body to obtain the desired lightweight vibrating plate.

According to a further aspect of the invention a diaphragm fastened to the first body and provided with a central opening is arranged between the vibrating plate and the first body. The vibrating plate has a corresponding opening, which openings are closed by a central stop provided in the gas chamber, when the vibrating plate, the membrane and the first body engage each other.

In accordance with the invention, a compact structure of the assembly is obtained by arranging in the centre of the first body a gas supply device, which communicates through an elastic hose with a gas supply duct. The gas supply device comprising a sleeve, which is rigidly secured to the first body and within which an inner sleeve is accommodated. The inner sleeve may be adjustable and the lower end constitutes the stop, the outer side of this inner sleeve is provided with a plate-shaped ring, which communicates with an inlet opening provided in the outer sleeve for the gas. The other end of this inlet opens out in a central air chamber. The central air chamber communicates through an opening, which may be adjustable, with a radial channel in the lower side of the inner sleeve. This channel opens out into an annular space, which is open on the lower side and located between the inner sleeve and the outer sleeve thus forming part of the gas chamber.

In order to reduce the disagreeable sound produced by the escaping gas, in one embodiment of the invention there is preferably provided in the opening of the vibrating plate a sound-damping mass, which is pervious to gas, for example, felt.

The invention will be described more fully with reference to the accompanying drawing, which shows a preferred embodiment of the invention and in which.

Figure 1:
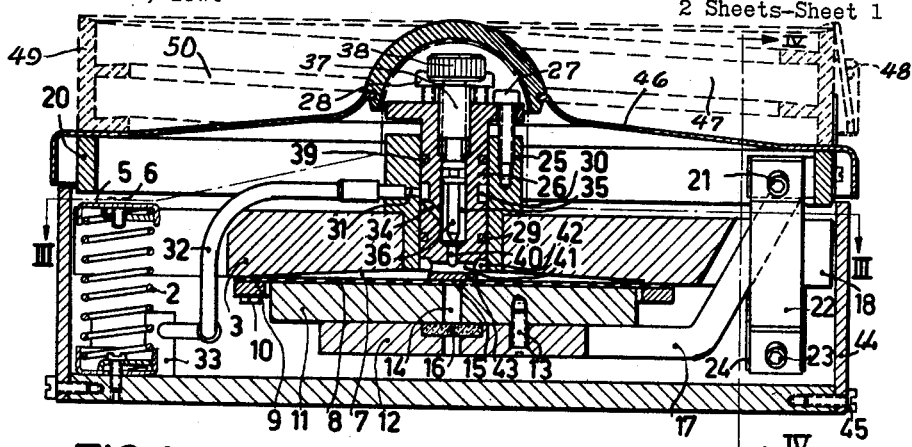
FIG. 1 is a sectional view of a vibratory hopper taken on the line II—II of FIG. 2.
Figure 2:
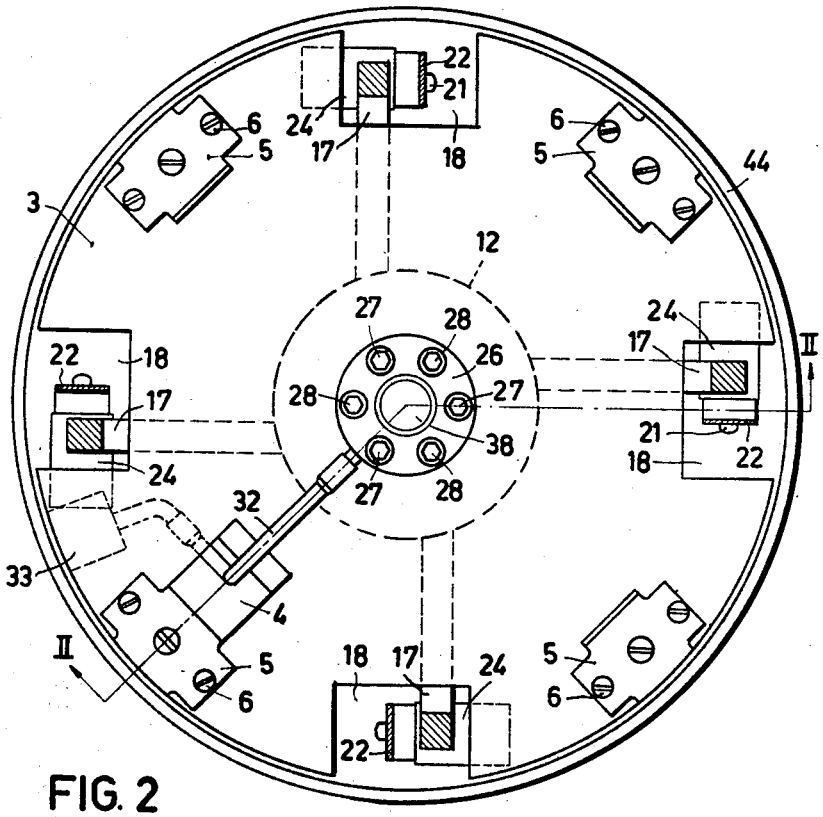
FIG. 2 is a sectional view of the vibratory hopper of FIG. 1, taken on the line III—III, viewed in the direction of the arrow.
Figure 3:
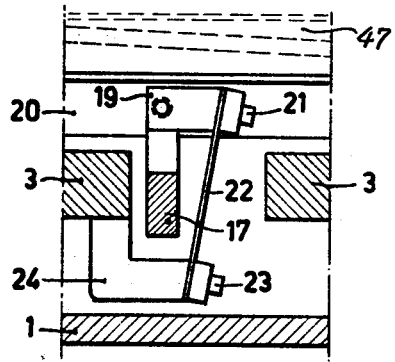
FIG. 3 is a sectional view taken on the line IV—IV of FIG. 1 also viewed in the direction of the arrow.

Referring to FIGS. 1, 2 and 3, reference numeral 1 designates a supporting plate, on which, with the interposition of pressure springs 2 a comparatively heavy plate 3 of cast iron is arranged. The plate 3 has four openings 4, which are distributed evenly along the circumference. In each opening a coil spring 2 is accommodated with the top end secured to the plate 3 by covering pieces 5 and screws 6. The plate 3 is shaped to provide an air chamber 7. The air chamber is closed by a rubber diaphragm or membrane 8, which is secured to the plate 3 by means of a ring 9 and screws 10. A vibrating plate 11, of aluminum, is secured on the membrane and a second plate 12 is secured to plate 11 by screws 13. The vibrating plate 11 is provided with an opening 14 and a corresponding opening 15 is provided in the membrane. Between the plate 12 and the vibrating plate 11 is provided a felt ring 16. The plate 12 has four arms 17, which are evenly distributed over the circumference of the plate and are accommodated in a second group of four slits 18 in the plate 3. Arms 17 project beyond this plate and are fastened at their top ends in eyelets 19, which are secured to an annular body 20. To this annular body 20 blade springs 22 are secured, by means of screws 21. The other end of blade springs 22 are connected by screws 23 with arms 24, which are integral with the plate 3.

Centrally of the plate 3 is arranged an outer sleeve 25, in which an inner sleeve 26, is held by screws 27. Sleeve 26 is adjustable in a direction of height by means of set screws 28. Between the two sleeves provision is made of O-shaped packing rings 29. The outer circumference of the inner sleeve 26 has an annular chamber 30, which communicates with a channel 31 in the outer sleeve, with which a rubber hose 32 is connected. The other end of this hose is secured to a connecting piece 33, rigidly secured to the plate 1. From the chamber 30 a duct 34 leads to a bore 35 within the inner sleeve, in which a needle 36 is arranged. The top end of needle 36 is provided with screwthread 37, which co-operates with a screwthread provided in the inner sleeve, so that the needle 36 can be moved up and down by turning a knob 38. An O-shaped ring 39 is provided for packing. A central duct 40 opens the chamber 35 and also at the other end with a radial duct 41, which in turn opens out at both ends into an annular chamber 42. Chamber 42 is located between the outer sleeve 25 and the inner sleeve 26. The lower part 43 of the inner sleeve constitutes a stop for the membrane 8 and closes the opening 15 of this membrane. A ring 44 is secured to the plate 1 by screws 45 and serves as a protecting ring and a gas arrester for the vibrator. The vibrator is covered by a hood 46. A vibrating hopper 47, shown in broken lines in FIG. 1 is connected by means of clamps 48 with the ring 20 and which consists, in known manner, of an annular body 49, in which a screwthread-like transport ring 50 is present.

Figure 5:
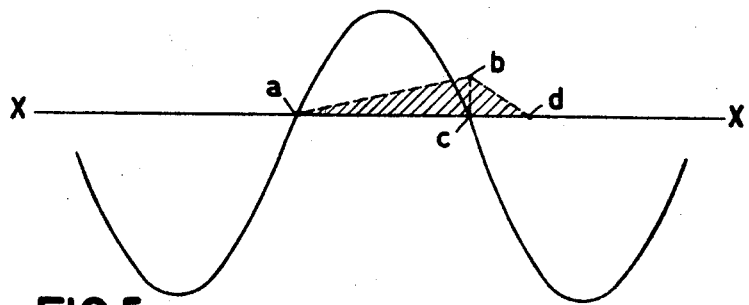
FIG. 5 is a graph of the vibration of the vibrating plate of FIG. 1 with the associated pressure variation in the air chamber of this figure.

The assembly operates as follows. If air is introduced under pressure into the hose 32, via fitting 33 it flows through the duct 31 in outer sleeve 25, into the chamber 30, in inner sleeve 26, from where it travels through the duct 34 and discharges into the chamber 35. The air flows out of this chamber through the opening 40 and arrives via the bore 41 and the chamber 42 in the air chamber 7. As soon as the pressure in this chamber is sufficiently high, the membrane 8 is bent downwards, so that the opening 15 of the membrane is set free of the stop 43. The air can then escape through the duct 14; the felt ring 16 then performs its choking effect. The felt ring 16 thus damps the sound of the escaping air. Owing to the movement of the vibrating plate 11 in a downward direction, the springs 22, which are secured to the vibrating plate by the arms 17, would also move downwards, but this is not possible, since these springs are secured to the plate 3 at their other ends via the arms 24. Owing to the oblique positions of these springs 22 the vibrating plate and hence the ring 20, which is rigidly secured to the vibrating plate by the arms 17 are turned or rotated and at the same time moved in a vertical downward sense, the amplitude of the rotation, measured at the circumference, being greater than the amplitude of the vertical movement. As soon as the air pressure in the chamber 7 has dropped sufficiently, the vibrating plate 11 with the ring 20 move back under the action of the springs 22, the stop 43 then again closes the opening 15 in the membrane. The body 3 is made from cast iron and is much heavier than the parts 11 and 12, which are made from aluminum and on a first approximation the plate 3 may be considered as being stationary. The movement of the vibrating plate 11 with respect to the plate 3 has a waveform as shown in FIG. 5, the line X—X indicating the position of the vibrating plate in which the outlet opening 15 is just closed; it is evident therefrom that the vibration of the vibrating plate has a sinusoidal movement. In this graph also the pressure variation in the air chamber 7 is shown. At the point $a$, where the opening 15 is just closed, the air chamber starts filling up and the pressure increases to a point $b$, which is located vertically above the point where the sine wave intersects the line X—X in the downward phase. At the point $c$ the air can escape from the air chamber 7 through the opening 15, but this is not performed very rapidly, since the openings 14 and 15 are comparatively small as compared with the volume of the air chamber. At $d$ the pressure in the air chamber has dropped to atmospheric pressure.

The area of the triangle $a$—$b$—$d$ is a measure of the energy produced by the air in each cycle. The area of the triangle of the left-hand side of the vertical broken line A—A indicates inertia or counteraction of the vibrating plate. The area on the right-hand side of the broken line A—A indicates energy causing the downward movement of the vibrating plate. The difference between the two areas is therefore a measure of the useful energy supplied. A comparatively low air pressure may therefore suffice. With a vibrator having a plate 3 of a diameter of 210 millimeters (mms.) and a vibrating plate 11 of a diameter of 100 mms. an excess pressure of 0.3 atmosphere in the air chamber was sufficient. Moreover, the noise of the escaping air was negligible.

The part of the wave above the line X—X is obtained by the slight compression of the elastic membrane after the engagement of the vibrating plate, so that the vibrating plate is allowed to move upwards a small distance.

Figure 4:
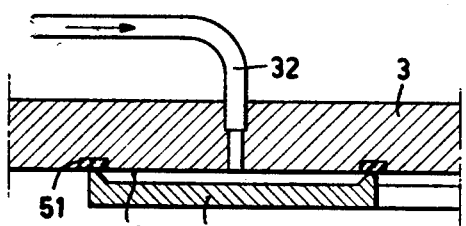
FIG. 4 shows a further embodiment of the air chamber shown in FIG. 1.
Figure 6:
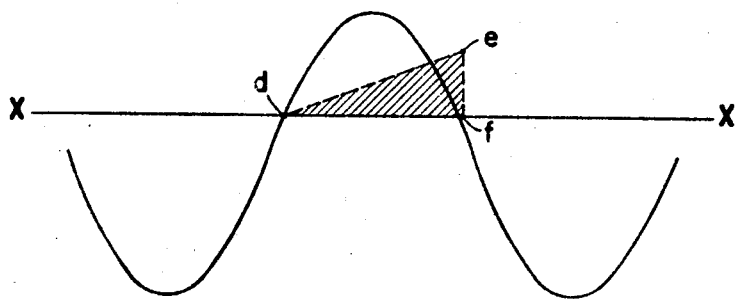
FIG. 6 shows a graph similar to that of FIG. 5 but this time for the air chamber illustrated in FIG. 4.

An alternate arrangement is shown in FIG. 4 in which the plate 3 may be provided with a rubber ring 51 and the vibrating plate 52 may be shaped in a form such that an air chamber 53 is formed therebetween. The vibration still exhibits a sinusoidal variation, as is shown in FIG. 6, but the pressure variation in the air chamber 53 is now indicated by the triangle $d$—$e$—$f$. In order to obtain the same amplitude the excess air pressure must be higher: moreover the vibrator produces much more noise. The structure is however, simpler.

It is not necessary to use air as a driving medium for the vibrator; other gases may be used. Also it is not necessary for the plate 3 to be arranged resiliently on the plate 1; the plate 3 may be arranged stationary. However, with a resilient arrangement the whole vibrator operates more efficiently. The springs 2 may be comparatively rigid.

The great advantage of the vibrator described resides in that the vibrating portion oscillates always in its own frequency and need not therefore be adapted to a source of oscillations, which has its own natural frequency. The amplitude of vibration may be controlled in a simple manner by adjusting the needle 36 by means of the knob 38. A further advantage of the device described in that no sliding or rotating parts are involved, to periodically close the gas supply and involve difficulties in sealing and may, in practice, give rise to leakage.

In practice the device described will require very little, if any maintenance.

It is, of course not necessary for the membrane and the vibrating plate to have a central opening; a plurality of openings may be provided, which are located concentrically to the centre line of the vibrator. The stop 43 is then to be formed by a ring, which is located in the air chamber 7 and the membrane may then be secured to the inner sleeve 25 not only at the circumference but also in the centre.

What is claimed is:

1. A gas driven vibrator, comprising a vibrating plate, a first body member opposite said plate, a gas chamber defined between said vibrating plate and said first body member, said chamber communicating continuously via an opening, with a gas supply duct, a gas outlet means being periodically controlled by the vibrating plate, a second body, rigid means connecting said second body and said vibrating plate, and elastic means connecting the first body member and the second body whereby said second body is capable of performing a vibration in a given plane and a vibration in a plane at right angles thereto.

2. A vibrator as claimed in claim 1, wherein said first body and said second body are arranged horizontally.

3. A vibrator as claimed in claim 2, wherein said vibrating plate is also arranged horizontally on the center line of the first body, and the vibrating plate and the second body coincide with said center line.

4. A vibrator as claimed in claim 3, wherein said first body is arranged resiliently with respect to the horizontal plane and said second body is resiliently mounted on said first body for oscillatory vibration.

5. A vibrator as claimed in claim 4, wherein said first body and said second body have a circular shape and said elastic means between these bodies comprises blade springs evenly distributed around the circumference of and radially with respect to said bodies and the longitudinal axis of said springs is at an angle to the perpendicular.

6. A vibrator as claimed in claim 5, wherein the amplitude of the horizontal vibration of the second body exceeds the amplitude of the vertical vibration thereof.

7. A vibrator as claimed in claim 1, wherein said gas chamber is defined by a diaphragm and the first body member, said diaphragm being rigidly secured to the body member and having a central opening, said central opening corresponding with an opening in said vibrating plate and said openings being closed by a central stop in the air chamber when the vibrating plate, the membrane and the first body member are adjacent each other.

8. A vibrator as claimed in claim 7, wherein a gas supply means is provided in the center of said first body member, said supply means comprising an outer sleeve rigidly secured to said first body member, said outer sleeve receiving an inner sleeve, the lower end of which constitutes said stop, an annular chamber defined between said inner and outer sleeves communicating at one end with a supply opening in the outer sleeve and at the other end with said gas chamber via an adjustable opening in the lower part of the inner sleeve, said adjustable opening communicating with a radial duct opening out into an annular space, between the inner sleeve and the outer sleeve, which space forms part of said gas chamber.

9. A vibrator as claimed in claim 8, wherein the opening in said vibrating plate is provided with a sound-damping mass which is pervious to gas.

10. A vibrator comprising a first body member of high inertia, resilient means firmly supporting said first body member, a driven member, fluid operated means for reciprocally driving said member, a second body member and means rigidly interconnecting said driven means with said second body member, offset means for resiliently connecting said first and second body members and supporting said members in spaced relation, said offset resilient means and said rigid interconnecting means being adapted to impart oscillatory and simultaneous reciprocal movement to said second body member relative to at least said first body member upon reciprocal vibration of said driven member, and hopper means secured to said second body member.

11. A vibrator comprising a first body member of high inertia, resilient means firmly supporting said body member, a driven member, a chamber defined between said first body member and said driven member, means for continuously communicating said chamber with a source of fluid under pressure, means operatively associated with said driven member and said first body member for opening said chamber to atmosphere, means mounting said driven member for movement by differential pressure existing between said chamber and atmosphere, a second body member, said means mounting said driven member for movement rigidly connecting said driven member and said second body member, means resiliently supporting said second body member in spaced relation with said first body member for oscillating and reciprocal movement relative to said first body member, and a helical hopper means secured to said second body member.

References Cited in the file of this patent

UNITED STATES PATENTS

| | | |
|---|---|---|
| 2,447,311 | Burt | Aug. 18, 1948 |
| 2,472,568 | Burt | June 7, 1949 |
| 3,023,738 | Burgess | Mar. 6, 1962 |